(12) United States Patent
Pan et al.

(10) Patent No.: US 9,225,400 B2
(45) Date of Patent: *Dec. 29, 2015

(54) METHOD AND APPARATUS FOR PROCESSING FEEDBACK IN A WIRELESS COMMUNICATION SYSTEM

(71) Applicant: INTERDIGITAL TECHNOLOGY CORPORATION, Wilmington, DE (US)

(72) Inventors: Kyle Jung-Lin Pan, Saint James, NY (US); Allan Y. Tsai, Boonton, NJ (US)

(73) Assignee: INTERDIGITAL TECHNOLOGY CORPORATION, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/318,495

(22) Filed: Jun. 27, 2014

(65) Prior Publication Data

US 2014/0314169 A1 Oct. 23, 2014

Related U.S. Application Data

(63) Continuation of application No. 11/928,198, filed on Oct. 30, 2007, now Pat. No. 8,798,212.

(60) Provisional application No. 60/870,503, filed on Dec. 18, 2006, provisional application No. 60/863,720, filed on Oct. 31, 2006, provisional application No. 60/863,432, filed on Oct. 30, 2006.

(51) Int. Cl.
*H04B 7/02* (2006.01)
*H04L 1/02* (2006.01)
(Continued)

(52) U.S. Cl.
CPC ............. *H04B 7/0417* (2013.01); *H04B 7/063* (2013.01); *H04B 7/065* (2013.01); *H04B 7/0639* (2013.01);
(Continued)

(58) Field of Classification Search
CPC .... H04B 7/0417; H04B 7/063; H04B 7/0639; H04B 7/0641; H04B 7/065
USPC .......................................... 375/346, 267, 347
See application file for complete search history.

(56) References Cited

U.S. PATENT DOCUMENTS 5,781,152 A 7/1998 Renard et al.
7,376,192 B2 * 5/2008 Koorapaty et al. ........... 375/259
(Continued)

FOREIGN PATENT DOCUMENTS

JP 2005-236481 2/2005
JP 2005-184730 A 7/2005
(Continued)

OTHER PUBLICATIONS

3rd Generation Partnership project (3GPP), R1-060458, "Link Analysis of Single and Multi Codeword Schemes-Precodin", QUALCOMM Europe, 3GPP TSG-Ran WG1, Meting #44, Denver United States, Feb. 13-17, 2006, 5 pages.
(Continued)

*Primary Examiner* — Qutbuddin Ghulamali
(74) *Attorney, Agent, or Firm* — Condo Roccia Koptiw LLP (57) ABSTRACT

A method and apparatus for processing feedback implemented in a wireless transmit/receive unit (WTRU) comprises estimating a channel matrix. The effective channel is calculated and a precoding matrix is selected. Feedback bits are generated and transmitted.

20 Claims, 5 Drawing Sheets (51) Int. Cl.
*H04B 7/04* (2006.01)
*H04B 7/06* (2006.01)
*H04L 1/06* (2006.01)
*H04L 25/02* (2006.01)

(52) U.S. Cl.
CPC ............ *H04B 7/0641* (2013.01); *H04L 1/0693* (2013.01); *H04L 25/0204* (2013.01); *H04L 25/0246* (2013.01)

(56) References Cited

U.S. PATENT DOCUMENTS

| | | | |
|---|---|---|---|
| 7,440,437 | B2 | 10/2008 | Song et al. |
| 7,492,829 | B2 | 2/2009 | Lin et al. |
| 7,584,157 | B2 | 9/2009 | Mitsutani et al. |
| 7,599,420 | B2 | 10/2009 | Forenza et al. |
| 7,627,051 | B2 | 12/2009 | Shen et al. |
| 7,676,007 | B1 * | 3/2010 | Choi et al. ............. 375/347 |
| 7,764,746 | B2 * | 7/2010 | Clerckx et al. ............. 375/267 |
| 2002/0174078 | A1 | 11/2002 | Mitsutani |
| 2003/0185310 | A1 | 10/2003 | Ketchum et al. |
| 2004/0001556 | A1 | 1/2004 | Harrison et al. |
| 2004/0106426 | A1 | 6/2004 | Koo et al. |
| 2004/0203885 | A1 | 10/2004 | Quaid et al. |
| 2005/0141631 | A1 | 6/2005 | Takano et al. |
| 2005/0190850 | A1 * | 9/2005 | Takano ............. 375/267 |
| 2005/0249304 | A1 | 11/2005 | Takano et al. |
| 2005/0254556 | A1 | 11/2005 | Fujii et al. |
| 2006/0018389 | A1 | 1/2006 | Koorapaty et al. |
| 2006/0039489 | A1 | 2/2006 | Ikram et al. |
| 2007/0098106 | A1 * | 5/2007 | Khojastepour et al. ....... 375/267 |
| 2007/0217540 | A1 * | 9/2007 | Onggosanusi et al. ....... 375/267 |
| 2008/0118004 | A1 | 5/2008 | Forenza et al. |

FOREIGN PATENT DOCUMENTS

| | | |
|---|---|---|
| JP | 2005-234681 A | 9/2005 |
| JP | 2005-311902 A | 11/2005 |
| JP | 2005-354665 A | 12/2005 |
| JP | 2006-516076 A | 6/2006 |
| RU | 2178953 C2 | 1/2002 |
| WO | WO 2006/112030 A1 | 4/2005 |
| WO | WO 2006/018710 A1 | 2/2006 |
| WO | WO 2006/052501 A1 | 5/2006 |
| WO | WO 2006/069300 | 6/2006 |
| WO | WO 2006/117665 A | 11/2006 |
| WO | WO 2007/106366 A | 9/2007 |
| WO | WO 2008/021396 A1 | 2/2008 |
| WO | WO 2008/054737 A2 | 5/2008 |

OTHER PUBLICATIONS $3^{rd}$ Generation Partnership Project (3GPP), TR 25.814 V7.1.0, "$3^{rd}$ Generation Partnership Project; Technical Specification Group Radio Access Network; Physical layer aspects for evolved Universal Terrestrial Radio Access (UTRA)", Release 7, Sep. 2006, 132 pages.

Edelman, et al., "The Geometry of Algorithms with Orthogonality Constraints", SIAM J. Matrix Anal. Appl. vol. 20, No. 2, pp. 303-353, Oct. 1998.

Gallivan, et al., "Efficient Algorithms for Inferences on Grassmann Manifolds", Proc. IEEE Workshop on Statistical Signal Processing, pp. 315-318, Sep. 2003.

Golub, et al, "Matrix Computations", Third Edition, pp. 77-79, 1996.

Love, et al., "What is the Value of Limited Feedback for MIMO Channels", IEEE Communications Magazine, vol. 42, Issue 10, pp. 54-59, Oct. 2004.

Love, et al., "Grassmannian Beamforming for Multiple-Input Multiple-Output Wireless Systems", IEEE Transactions on Information Theory, vol. 49, No. 10, Oct. 2003.

Michalke, et al., "Efficient Tracking of Eigenspaces and its Application to Eigenbeamforming", $14^{th}$ IEEE Proceeding on Personal, Indoor and Mobile Radio Communications, vol. 2, pp. 2847-2851, Sep. 7, 2003.

$3_{rd}$ Generation Partnership Project (3GPP), R1-062160, "Uplink MIMO Precoding Using Differential Feedback", InterDigital Communications Corporation, 3GPP TSG RAN WG1, Meeting # 46, Tallinn, Estonia, Aug. 28-Sep. 1, 2006, 10 pages.

3rd Generation Partnership Project (3GPP), R1-050889, "MIMO for Long Term Evolution", Samsung, 3GPP TSG RAN WG1, Meeting # 42, London, UK, Aug. 29-Sep. 2, 2005, 19 pages.

* cited by examiner

METHOD AND APPARATUS FOR PROCESSING FEEDBACK IN A WIRELESS COMMUNICATION SYSTEM

CROSS REFERENCE TO RELATED APPLICATIONS

This application is a continuation of U.S. patent application Ser. No. 11/928,198, filed Oct. 30, 2007, which claims the benefit of U.S. Provisional Application No. 60/863,432, filed Oct. 30, 2006, U.S. Provisional Application No. 60/863,720, filed Oct. 31, 2006, and U.S. Provisional Application No. 60/870,503, filed Dec. 18, 2006, all of which are incorporated herein by reference as if fully set forth herein, for all purposes.

FIELD OF INVENTION

The present invention is related to wireless communication systems.

BACKGROUND

Controlled feedback is used in a communication system to add layers of control to the system. The feedback systems currently used in wireless communication systems are generally complex and consume valuable resources. One such system that employs feedback is an evolved universal terrestrial radio access (E-UTRA) multiple-in multiple-out (MIMO) system. Improving the efficiency of feedback and rank and link adaptation to the closed-loop MIMO system for E-UTRA may therefore tend to improve MIMO link performance and system capacity, as well as reduce signaling overhead.

It would therefore be beneficial to provide a method and apparatus for processing feedback that could be employed, for example, in an E-UTRA MIMO system for both downlink (DL) and uplink (UL) communications.

SUMMARY

A method and apparatus for processing feedback implemented in a wireless transmit/receive unit (WTRU) is disclosed. The method includes estimating a channel matrix. The effective channel is calculated and a precoding matrix is selected. Feedback bits are generated and transmitted.

BRIEF DESCRIPTION OF THE DRAWINGS

A more detailed understanding of the invention may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
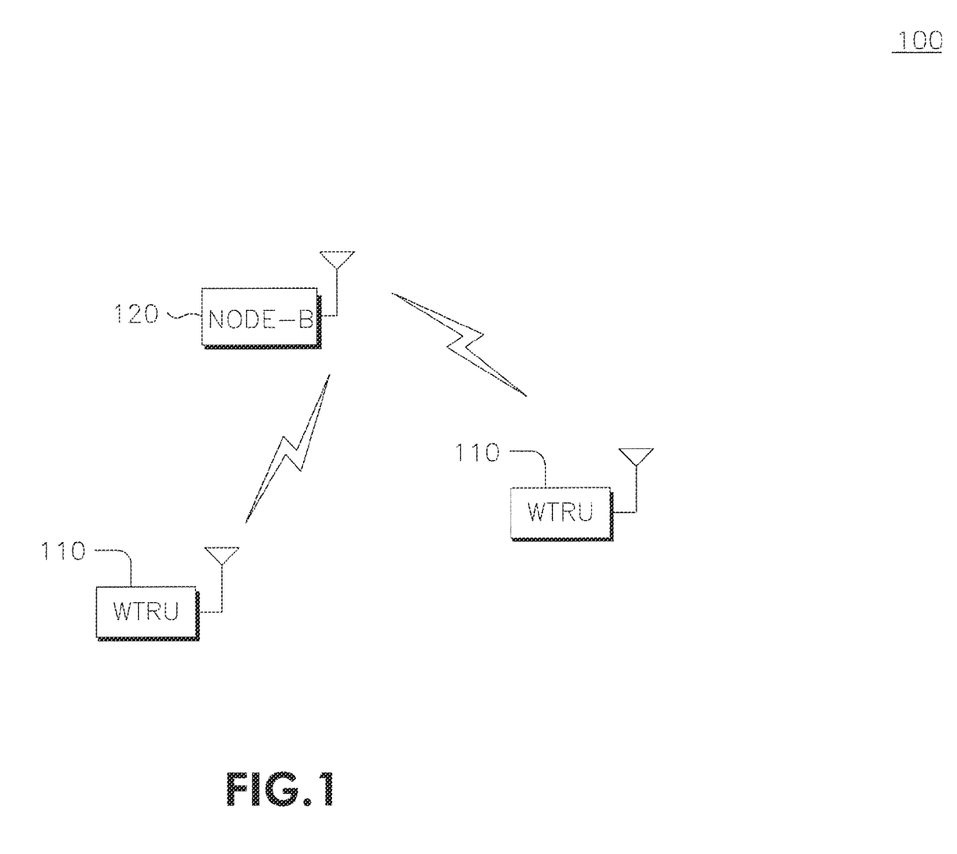
FIG. 1 shows an example wireless communication system, including a plurality of wireless transmit/receive units (WTRUs) and a base station.

FIG. 1 shows an example wireless communication system 100, including a plurality of WTRUs 110 and a base station 120. As shown in FIG. 1, the WTRUs 110 are in communication with the base station 120. Although two WTRUs 110, and one base station 120 are shown in FIG. 1, it should be noted that any combination of wireless and wired devices may be included in the wireless communication system 100.

Figure 2:
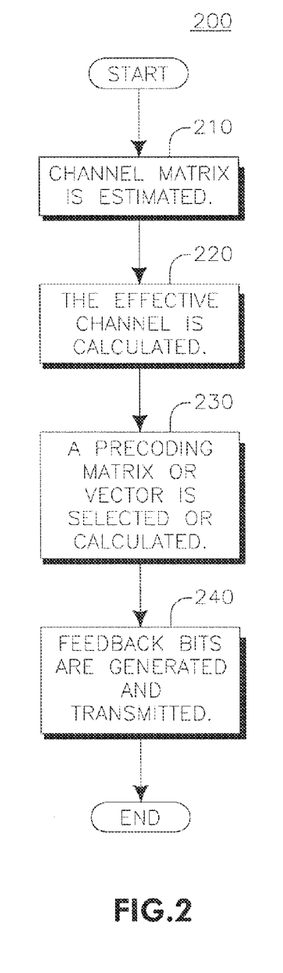
FIG. 2 is a flow diagram of a method of reset processing feedback.

FIG. 2 is a flow diagram of a method 200 of reset processing feedback. In reset processing, non-differential feedback is utilized. In step 210 of method 200, the channel matrix is estimated. Once the channel matrix is estimated, the effective channel is calculated (step 220). In one example, the effective channel is calculated as a multiplication of the channel estimate and the precoding matrix, such as $H\_eff=H\_est \times T$, where $H\_est$ is the channel estimate and $T$ is the precoding matrix. The effective channel is calculated for all possible candidate precoding matrices, sub-matrices, or vectors. A metric is computed using the effective channel that may include signal to interference plus noise ratio (SINR), throughput, block or frame error rate, channel capacity, and the like.

A precoding matrix or vector is then selected or calculated (step 230). The best matrix, submatrix or vector should be selected based on channel quality, SINR, throughput, block error ration (BLER), frame error ratio (FER) or other similar measures or combinations. For example the SINR for a linear minimum mean squared error (LMMSE) receiver can be computed and the precoding matrix that has the largest SINR may be selected. Other methods based on effective channels and their corresponding CQI measurements can also be used to select the precoding matrix or vector. In the case of calculating the matrix or vector, the channel matrix estimate is used as a base and the precoding matrix is computed by performing, for example, a singular value decomposition (SVD) or eigen-value decomposition (EVD) on the channel matrix estimate, and then quantized using a predetermined codebook.

One way for selecting the precoding matrix is that the channel responses H are estimated and a singular value decomposition (SVD) is performed on the estimated Hs to obtain a precoding matrix V. For N streams of MIMO transmission, where $1 \leq N \leq N_t$, A is a sub-matrix of V that represents the N stream precoding of data. Furthermore $B_i$ is the possible combinations of N column vectors of a matrix F. All the possible combinations of column vectors of F, (i.e., all the possible $B_i$), may be searched and the one selected which maximizes the sum of norm of the inner product or correlation of A and $B_i$ in the search in accordance with the following equation:

$$T = \max_{B_i} \sum_{j=1}^{N} \|\langle A(:,j)^*, B_i(:,j)\rangle\|. \quad \text{Equation (1)}$$

A discrete Fourier transform (DFT) matrix may be utilized for MIMO precoding, and a set of precoding matrices can be constructed using a DFT matrix multiplied with different phase shifts. The set of DFT matrices can be used as a MIMO precoding codebook based on whether the precoding matrix is either selected or quantized.

A DFT matrix can be represented by $$w_{m,n} = e^{j2\pi m \frac{n}{N}},$$

where m=0, 1, 2, ..., N−1 and n=0, 1, 2, ..., N−1. A two-by-two (2×2) DFT matrix may be expressed as:

$$F_{2 \times 2} = \begin{bmatrix} 1 & 1 \\ 1 & -1 \end{bmatrix}. \quad \text{Equation (2)}$$

A four-by-four (4×4) DFT matrix may be expressed as:

$$F_{4 \times 4} = \begin{bmatrix} 1 & 1 & 1 & 1 \\ 1 & j & -1 & -j \\ 1 & -1 & 1 & -1 \\ 1 & -j & -1 & j \end{bmatrix}. \quad \text{Equation (3)}$$

A set of precoding matrices can be generated using different phase shifts in accordance with the following equation:

$$w_{m,n} = e^{j2\pi m\left(n + \frac{l}{L}\right)/N}, \quad \text{Equation (4)}$$

where m=1, 2, ..., N−1, n=0, 1, 2, ..., N−1 and l=0, 1, 2, ..., L−1. To generate a set of eight 4×4 matrices, L=8 and N=4 are used, where N and L are design parameters to generate L DFT matrices of size N×N. Accordingly, a set of 4×4 precoding matrices may be constructed as follows:

$$F_{4 \times 4,0} = \begin{bmatrix} 1 & 1 & 1 & 1 \\ 1 & e^{j\frac{1}{2}\pi} & e^{j\pi} & e^{-j\frac{1}{2}\pi} \\ 1 & e^{j\pi} & e^{j2\pi} & e^{j\pi} \\ 1 & e^{-j\frac{1}{2}\pi} & e^{j\pi} & e^{j\frac{1}{2}\pi} \end{bmatrix}; \quad \text{Equation (5)}$$

$$F_{4 \times 4,1} = \begin{bmatrix} 1 & 1 & 1 & 1 \\ e^{j\frac{1}{16}\pi} & e^{j\frac{9}{16}\pi} & e^{-j\frac{15}{16}\pi} & e^{-j\frac{7}{16}\pi} \\ e^{j\frac{1}{8}\pi} & e^{-j\frac{7}{8}\pi} & e^{j\frac{1}{8}\pi} & e^{-j\frac{7}{8}\pi} \\ e^{j\frac{3}{16}\pi} & e^{-j\frac{5}{16}\pi} & e^{-j\frac{13}{16}\pi} & e^{j\frac{11}{16}\pi} \end{bmatrix};$$

$$F_{4 \times 4,2} = \begin{bmatrix} 1 & 1 & 1 & 1 \\ e^{j\frac{1}{8}\pi} & e^{j\frac{5}{8}\pi} & e^{-j\frac{7}{8}\pi} & e^{-j\frac{3}{8}\pi} \\ e^{j\frac{1}{4}\pi} & e^{-j\frac{3}{4}\pi} & e^{j\frac{1}{4}\pi} & e^{-j\frac{3}{4}\pi} \\ e^{j\frac{3}{8}\pi} & e^{-j\frac{1}{8}\pi} & e^{-j\frac{5}{8}\pi} & e^{j\frac{7}{8}\pi} \end{bmatrix};$$

$$F_{4 \times 4,3} = \begin{bmatrix} 1 & 1 & 1 & 1 \\ e^{j\frac{3}{16}\pi} & e^{j\frac{11}{16}\pi} & e^{-j\frac{13}{16}\pi} & e^{-j\frac{5}{16}\pi} \\ e^{j\frac{3}{8}\pi} & e^{-j\frac{5}{8}\pi} & e^{j\frac{3}{8}\pi} & e^{-j\frac{5}{8}\pi} \\ e^{j\frac{9}{16}\pi} & e^{j\frac{1}{16}\pi} & e^{-j\frac{7}{16}\pi} & e^{-j\frac{15}{16}\pi} \end{bmatrix};$$

$$F_{4 \times 4,4} = \begin{bmatrix} 1 & 1 & 1 & 1 \\ e^{j\frac{1}{4}\pi} & e^{j\frac{3}{4}\pi} & e^{-j\frac{3}{4}\pi} & e^{-j\frac{1}{4}\pi} \\ e^{j\frac{1}{2}\pi} & e^{-j\frac{1}{2}\pi} & e^{j\frac{1}{2}\pi} & e^{-j\frac{1}{2}\pi} \\ e^{j\frac{3}{4}\pi} & e^{j\frac{1}{4}\pi} & e^{-j\frac{1}{4}\pi} & e^{j\frac{5}{4}\pi} \end{bmatrix};$$

$$F_{4 \times 4,5} = \begin{bmatrix} 1 & 1 & 1 & 1 \\ e^{j\frac{5}{16}\pi} & e^{j\frac{13}{16}\pi} & e^{-j\frac{11}{16}\pi} & e^{-j\frac{3}{16}\pi} \\ e^{j\frac{5}{8}\pi} & e^{-j\frac{3}{8}\pi} & e^{j\frac{5}{8}\pi} & e^{-j\frac{3}{8}\pi} \\ e^{j\frac{15}{16}\pi} & e^{j\frac{7}{16}\pi} & e^{-j\frac{1}{16}\pi} & e^{-j\frac{9}{16}\pi} \end{bmatrix};$$

$$F_{4 \times 4,6} = \begin{bmatrix} 1 & 1 & 1 & 1 \\ e^{j\frac{3}{8}\pi} & e^{j\frac{7}{8}\pi} & e^{-j\frac{5}{8}\pi} & e^{-j\frac{1}{8}\pi} \\ e^{j\frac{3}{4}\pi} & e^{-j\frac{1}{4}\pi} & e^{j\frac{3}{4}\pi} & e^{j\frac{1}{4}\pi} \\ e^{j\frac{9}{8}\pi} & e^{j\frac{5}{8}\pi} & e^{j\frac{1}{8}\pi} & e^{-j\frac{3}{8}\pi} \end{bmatrix};$$

$$F_{4 \times 4,7} = \begin{bmatrix} 1 & 1 & 1 & 1 \\ e^{j\frac{7}{16}\pi} & e^{j\frac{15}{16}\pi} & e^{-j\frac{9}{16}\pi} & e^{-j\frac{1}{16}\pi} \\ e^{j\frac{7}{8}\pi} & e^{-j\frac{1}{8}\pi} & e^{j\frac{7}{8}\pi} & e^{-j\frac{1}{8}\pi} \\ e^{j\frac{11}{16}\pi} & e^{j\frac{13}{16}\pi} & e^{j\frac{5}{16}\pi} & e^{-j\frac{3}{16}\pi} \end{bmatrix}.$$

A set of 2×2 matrices may be generated and constructed in a similar manner.

In step 240, feedback bits are generated and transmitted. The feedback bits include the corresponding codeword index. In the case of 4×4 MIMO matrix, and for full rank, (i.e., the rank equals four (4)), an index associated with one of the matrices identified in equation (5) may be used as the feedback input. For a rank less than four (4), an index associated with one of the column subsets of the matrices in equation (5) may be used as the feedback input. For the case where the rank equals one, an index associated with one of the column vectors of the matrices may be used as the feedback input.

An additional feedback mechanism utilizes adaptive processing. In general, adaptive processing is either "fast adaptive" or "slow adaptive" depending on degree of accuracy of updating with respect to the desired precoding matrix or convergence rate.

Figure 3:
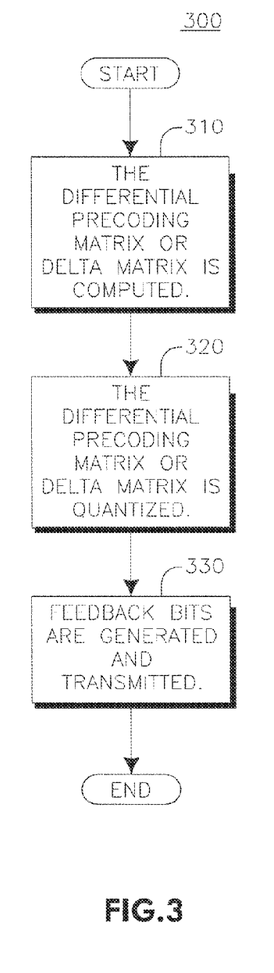
FIG. 3 is a flow diagram of a method of fast adaptive processing feedback.

FIG. 3 is a flow diagram of a method 300 of fast adaptive processing feedback. Fast adaptive processing feedback is a fast tracking method and can be used as a stand-alone feedback or as a feedback which is in conjunction with the full precoding matrix feedback depicted in method 200 of FIG. 2.

In step 310, the differential precoding matrix or delta matrix is computed. Then the differential precoding matrix or delta matrix is quantized (step 320).

Feedback bits are generated and transmitted (step 330), where the feedback bits correspond to a codeword index of a differential codebook. The more feedback bits that are used, the faster the precoding matrix is updated using the feedback bits, which represent the differential precoding matrix. Accordingly, faster adaptive processing may be achieved.

Figure 4:
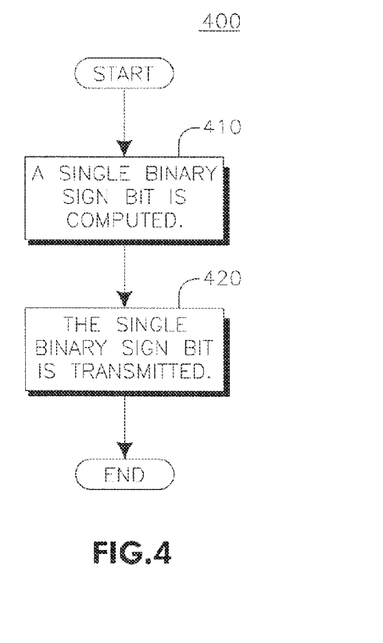
FIG. 4 is a flow diagram of a method of slow adaptive processing feedback.

FIG. 4 is a flow diagram of a method 400 of slow adaptive processing feedback. Slow adaptive processing feedback is a slow tracking method and can be used as a stand-alone feedback or as a feedback which is in conjunction with the full precoding matrix feedback (reset) depicted in method 200 of FIG. 2. Slow adaptive processing feedback can also be used in conjunction with the differential precoding matrix feedback depicted in method 300 of FIG. 3, or a combination of the methods 200 and 300 of FIGS. 2 and 3, respectively.

In step 410, a single binary sign bit is computed, and the single binary sign bit is then transmitted (step 420), for example from a receiver device to a transmitter device. The single binary sign bit, b[n], may be computed using a measurement of the effective channel in accordance with the following equation:

$$b[n]=\text{sign}(q[n]). \quad \text{Equation (6)}$$

The measure q[n] is an effective channel measurement for the preferred direction that maximizes the received power. If $\Omega_1[n]$ and $\Omega_0[n]$ are denoted to be $\Omega_1[n]=\tilde{T}[n]\exp(F[n])Y$ and $\Omega_0[n]=\tilde{T}[n]\exp(-F[n])Y$, respectively, then q[n] may be expressed as:

$$q[n]=\|H[n+1]\Omega_1[n]\|_F^2 - \|H[n+1]\Omega_0[n]\|_F^2. \quad \text{Equation (7)}$$

If the direction of received power maximization is toward $\Omega_1[n]$, then b[n]=1 is transmitted (step 420). Otherwise, the direction of received power maximization is toward $\Omega_0[n]$, and the feedback b[n]=−1 is transmitted (step 420).

The index to the best precoding matrix or vector is selected and fed back, (i.e., transmitted). The precoding matrix is updated during the period between resets or between full precoding matrix updates for the following feedback interval by the single binary bit for slow adaptive processing, or slow tracking of the best selected precoding matrix which is selected at reset period.

For example, letting Nt denote the number of transmit antennas and Ns denote the number of transmitted data streams, the precoding matrix that is fed back is T[n] for a feedback instance n. The precoding matrix T[n], then, is updated by the single binary bit b[n] that is fed back from a receiver at feedback instance n+1. The precoding matrix is updated from T[n] to T[n+1] using feedback bit b[n].

Grassmann manifold or Grassmann line packing can be used to define the beamforming space. A signal flow along the curve of the shortest length in Grassmann manifold $G_{Nt,Ns}$ and can be expressed as:

$$Q(t)=Q(0)\exp(tX)Y, \quad \text{Equation (8)}$$

where Q(0) and Q(t) are the points in Grassmann manifold space at time 0 and t respectively. X is a skew-symmetric matrix and is restricted to be of the form:

$$X = \begin{bmatrix} 0 & -Z^H \\ Z & 0 \end{bmatrix}. \quad \text{Equation (9)}$$

The matrix Y may be expressed by:

$$Y = \begin{bmatrix} I_{N_s} \\ 0_{(N_t-N_s)\times N_s} \end{bmatrix}. \quad \text{Equation (10)}$$

The precoding matrix and its update may then be defined in accordance with the following equation:

$$T[n+1] = \tilde{T}[n]\exp(b[n]F[n])Y, \quad \text{Equation (11)}$$

where $$F[n] = \begin{bmatrix} 0 & -G^H[n] \\ G[n] & 0 \end{bmatrix}, \quad \text{Equation (12)}$$

and has dimension Nt by Nt. $\tilde{T}[n]=[T[n]\ E[n]]$ is a unitary matrix of dimension Nt by Nt and E[n] is the orthogonal complement of T[n]. Matrix Y has dimension Nt by Ns. Matrix G[n] is a random matrix and has dimension Nt−Ns by Ns. Matrix G[n] is used to approximate matrix Z and is generated with a certain distribution, of which one example is uniform distribution. Another example is independent and identical complex Gaussian distribution with zero mean and variance) $\beta^2$. That is, each entry of G[n] is independently and identically distributed, (e.g., $CN(0,\beta^2)$). However, other proper distributions for G[n] may also be considered and used. The exponential term $\exp(b[n]F[n])Y$ represents the signal flow from the current to the next precoding matrix along the curve of the shortest length in the beamforming space. The single binary bit b[n] determines one of the two opposite directions of the signal flow determined by F[n] along the curve of the shortest length in the beamforming space when the precoding matrix is updated.

In order to obtain the same update for the precoding matrix, the matrix G[n] should be known to both a transmitter and receiver. This can be done by synchronously generating G[n] by pseudo random number generators at the transmitter and the receiver at the time when communication between the transmitter and receiver starts. However, signaling may also be utilized to communicate the information about matrix G between the transmitter and receiver.

The parameter $\beta^2$ in matrix G is a step size of the precoding matrix update and can be static, semi-static or dynamic. For optimum performance the parameter $\beta^2$ should be adaptively adjusted according to Doppler shift, with the value of $\beta^2$ increasing as Doppler frequency increases, and vice versa.

The feedback rate, or feedback interval, depends on the rate of channel variation or vehicle speed. The optimum feedback rate or interval may be determined using simulations. A fixed feedback rate or interval can be used to compromise between different vehicle speeds or channel variation. A feedback rate or interval can also be configured or reconfigured to meet certain performance requirements. Additionally, if information about vehicle speed or Doppler shift are available, that information may be used to configure or reconfigure the feedback rate or interval. The step size of the precoding matrix update can also be determined or optimized according to different rates of channel variation.

T[n+1], given T[n] and G[n], may be computed using compact singular (CS) decomposition and the like. For example, the matrix G[n] may be decomposed using singular value decomposition (SVD) in accordance with the following equation:

$$G[n]=V_2\Theta V_1^H. \quad \text{Equation (13)}$$

The matrix Θ is a diagonal matrix such that:

$$\Theta = \text{diag}(\theta_1, \theta_2, \ldots, \theta_{N_s}), \quad \text{Equation (14)}$$

The variables $\theta_i$, where $i=1, 2, \ldots, N$, are the principal angles between the subspaces T[n] and T[n+1]. If the feedback bit b[n] is −1, −G[n] may be decomposed instead.

The values of $\sin(\theta_i)$ and $\cos(\theta_i)$ for $i=1, 2, \ldots, N_s$, are computed and diagonal matrices C and S are constructed such that:

$$C = \text{diag}(\cos\theta_1, \cos\theta_2, \ldots, \cos\theta_{N_s}), \quad \text{Equation (15)}$$

and $$S = \text{diag}(\sin\theta_1, \sin\theta_2, \ldots, \sin\theta_{N_s}). \quad \text{Equation (16)}$$

The matrix T[n+1] may be computed in accordance with the following equation:

$$T[n+1] = \tilde{T}[n] \begin{bmatrix} V_1 C \\ V_2 S \end{bmatrix}. \quad \text{Equation (17)}$$

Reset processing or non-differential feedback may be used initially and periodically every N transmission time intervals (TTIs) to reset the error arising from differential and binary feedback. In addition, reset or non-differential feedback may be used aperiodically. The fast adaptive processing or differential feedback may be used for "X" TTIs following the initialization, reset or non-differential feedback. The slow adaptive processing or binary feedback may be used between the time when a fast adaptive feedback period ends and the time when the reset or non-differential feedback begins.

Figure 5:
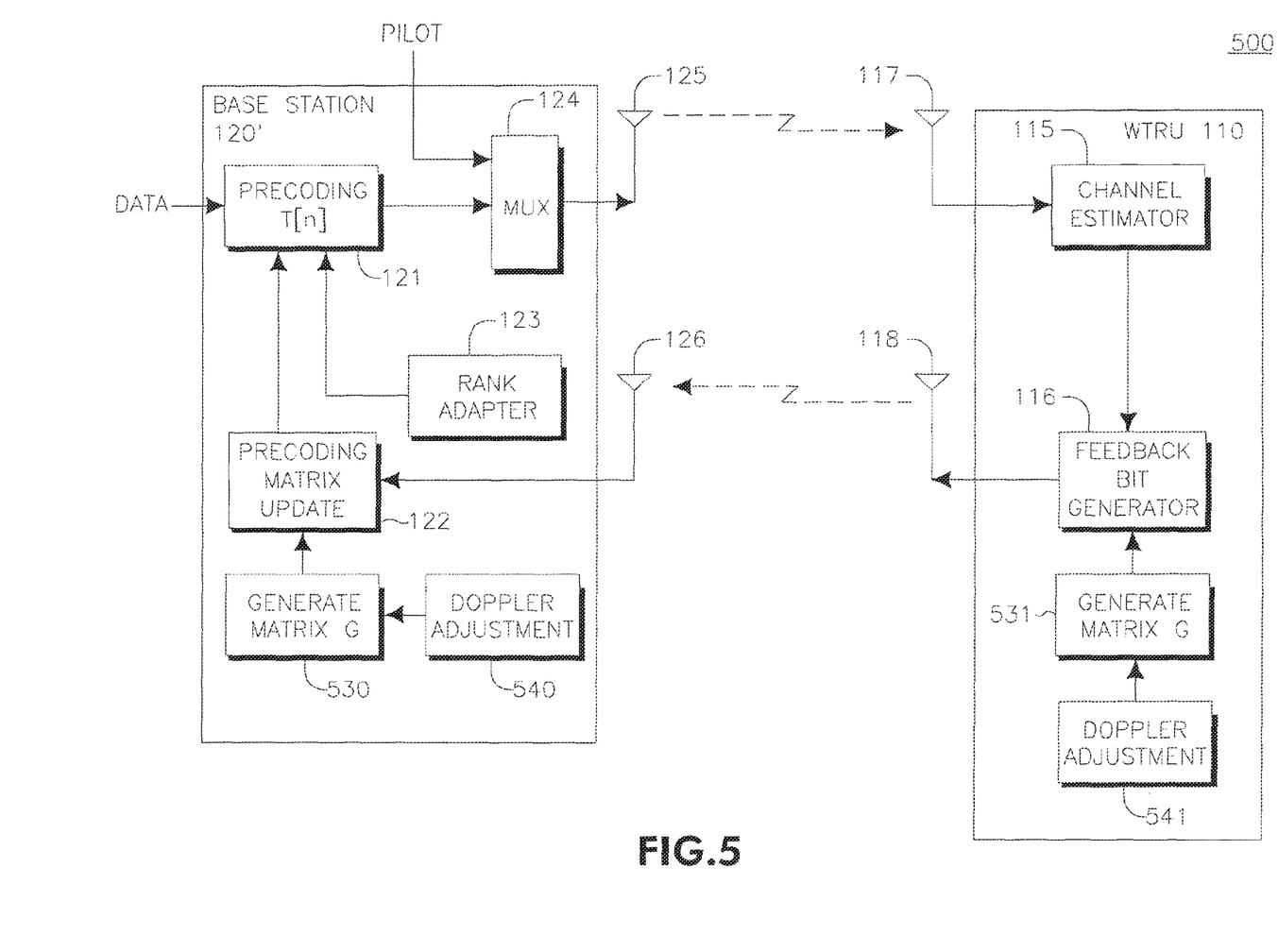
FIG. 5 shows a functional block diagram of a WTRU and the base station of FIG. 1.

FIG. 5 shows a functional block diagram 500 of a WTRU 110 and a base station 120' of FIG. 1. The WTRU 110 and base station 120' of FIG. 5 are configured to perform any combination of the methods 200, 300, and 400 described in FIGS. 2, 3, and 4, and are in wireless communication with one another. The methods 200, 300, and 400 in FIGS. 2, 3, and 4 can be used in different time or different feedback intervals between the base station 120' and the WTRU 110. In the example shown in FIG. 5, the base station 120' may be considered as a transmitter, or transmitting device, while the WTRU 110 is a receiver, or receiving device.

In addition to other components that may be included in a WTRU, (e.g., a transmitter, a receiver, and the like), the WTRU 110 of FIG. 5 includes a channel estimator 115 and a feedback bit generator 116 in communication with the channel estimator 115. In addition, the WTRU 110 includes a first antenna 117 and a second antenna 118. As depicted in FIG. 5, the first antenna 117 is in communication with the channel estimator 115 and may receive and forward wireless communications from the base station 120 to the channel estimator 115. The second antenna 118 is in communication with the feedback bit generator 116 and may receive a signal from the feedback bit generator 116 and transmit it to the base station 120'. It should be noted however, that any number and configuration of antennas may be included in the WTRU 110. For example, the first antenna 117 may be in communication with the feedback bit generator 116 and the second antenna 118 may be in communication with the channel estimator 115. The channel estimator 115 is configured to perform the channel estimation functions described in methods 200, 300, and 400 of FIGS. 2, 3, and 4, respectively. The feedback bit generator 116 is configured to generate the feedback to be transmitted back to the base station 120' in accordance with the methods 200, 300, and 400 of FIGS. 2, 3, and 4, respectively, or any combination of methods 200, 300, and 400.

A generate matrix G functional block 531 is in communication with the feedback bit generator block 116 of the WTRU 110, and a doppler adjustment block 541 is in communication with the generate matrix G functional block 531. The generate matrix G functional block 531 and doppler adjustment block 541 are configured to perform the related functions described in methods 200, 300, and 400, of FIGS. 2, 3, and 4, respectively.

In addition to other components that may be included in a base station, (e.g., a transmitter, a receiver, and the like), the base station 120' includes a precoding block 121, a precoding matrix update block 122, a rank adapter 123, and a multiplexer (MUX) 124. The precoding block 121 is in communication with the precoding matrix update block 122, the rank adapter 123 and the MUX 124. In addition, a first antenna 125 is in communication with the MUX 124 and may receive a signal from the MUX 124 to facilitate wireless communication to the WTRU 110. A second antenna 126 is in communication with the precoding matrix update block 122, and may facilitate the reception of wireless communications received from the WTRU 110. It should be noted again that either antenna, 125 or 126, may be in communication with any of the components. The precoding block 121 is further configured to receive a data signal, and the MUX 124 is configured to also receive a pilot signal. In addition, the precoding block 121, precoding matrix update block 122, and the rank adapter 123 are configured to perform the related functions described in methods 200, 300, and 400, of FIGS. 2, 3, and 4, respectively, or any combination of methods 200, 300, and 400.

A generate matrix G functional block 530 is in communication with the precoding matrix update block 122 of the base station 120', and a doppler adjustment block 540 is in communication with the generate matrix G functional block 530. The generate matrix G functional block 530 and doppler adjustment block 540 are configured to perform the related functions described in methods 200, 300, and 400, of FIGS. 2, 3, and 4, respectively.

Figure 6:
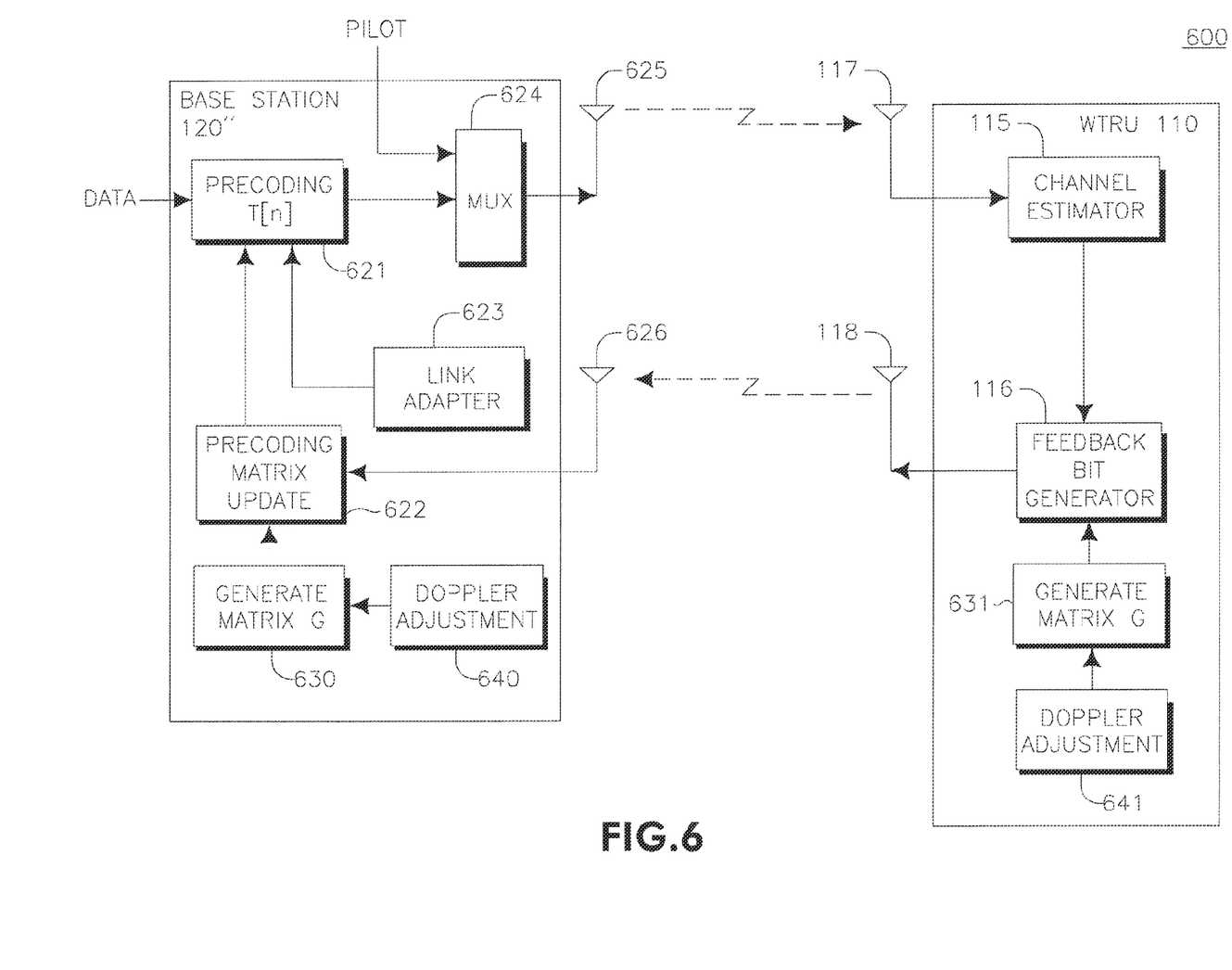
FIG. 6 shows an alternative functional block diagram of a WTRU and the base station of FIG. 1.

FIG. 6 shows an alternative functional block diagram 600 of a WTRU 110 and a base station 120" of FIG. 1. The WTRU 110 and base station 120" of FIG. 6 are configured to perform any combination of the methods 200, 300, and 400 described in FIGS. 2, 3, and 4, and are in wireless communication with one another. The WTRU 110 shown in FIG. 6 is substantially similar to the WTRU 110 described above in FIG. 5. In the example shown in FIG. 6, the base station 120" may be considered as a transmitter, or transmitting device, while the WTRU 110 is a receiver, or receiving device.

A generate matrix G functional block 631 is in communication with the feedback bit generator block 116 of the WTRU 110. A doppler adjustment block 641 is in communication with the generate matrix G functional block 631. The generate matrix G functional block 631 and doppler adjustment block 641 are configured to perform the related functions described in methods 200, 300, and 400, of FIGS. 2, 3, and 4, respectively.

In addition to other components that may be included in a base station, (e.g., a transmitter, a receiver, and the like), the base station 120" includes a precoding block 621, a precoding matrix update block 622, a link adapter 623, and a multiplexer (MUX) 624. The precoding block 621 is in communication with the precoding matrix update block 622, the link adapter 623 and the MUX 624. In addition, a first antenna 625 is in communication with the MUX 624 and may receive a signal from the MUX 624 to facilitate wireless communication to the WTRU 110. A second antenna 626 is in communication with the precoding matrix update block 622, and may facilitate the reception of wireless communications received from the WTRU 110. The precoding block 621 is further configured to receive a data signal, and the MUX 624 is configured to also receive a pilot signal. In addition, the precoding block 621, precoding matrix update block 622, and the link adapter 623 are configured to perform the related functions described in methods 200, 300, and 400, of FIGS. 2, 3, and 4, respectively.

A generate matrix G functional block 630 is in communication with the precoding matrix update block 622 of the base station 120". A doppler adjustment block 640 is in communication with the generate matrix G functional block 630. The generate matrix G functional block 630 and doppler adjustment block 640 are configured to perform the related functions described in methods 200, 300, and 400, of FIGS. 2, 3, and 4, respectively.

Figure 7:
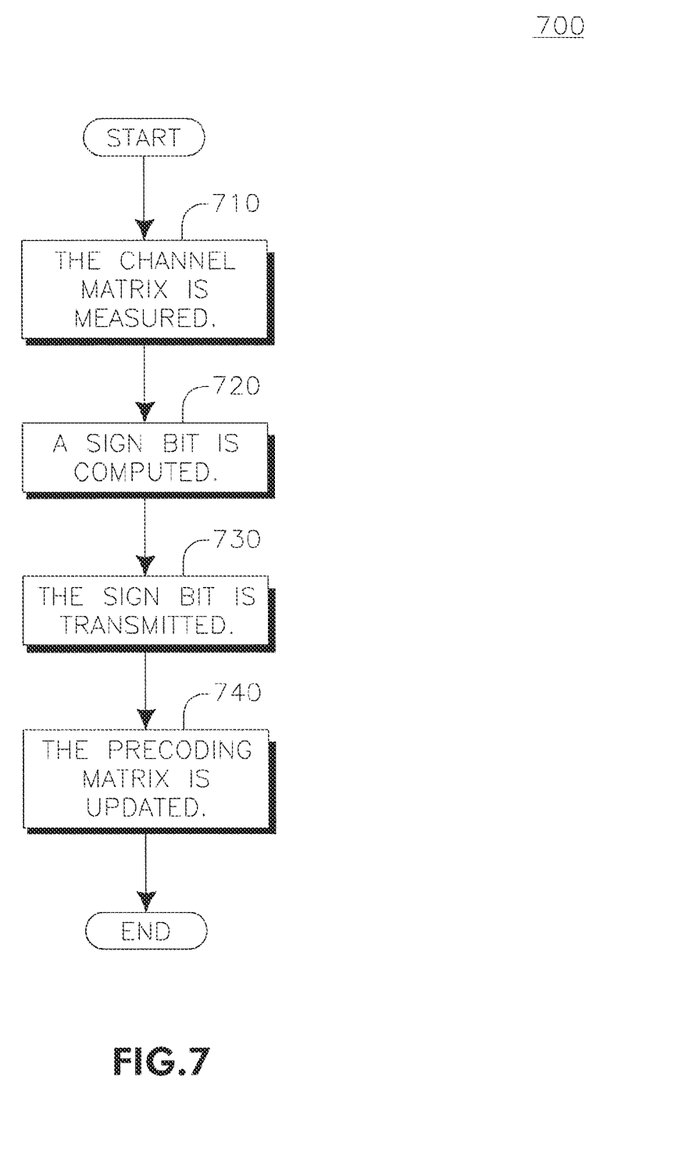
FIG. 7 is a flow diagram of an additional method of processing feedback.

FIG. 7 is a flow diagram of an additional method 700 of processing feedback. In step 710, the channel matrix His measured. A sign bit is then computed (step 720), based on the direction of the geodesic that maximizes received power. The sign bit is then transmitted (step 730), for example from a receiver to a transmitter, and the precoding matrix is updated (step 740) by the transmitter using the sign bit so that the new precoding matrix approaches the direction of maximizing receiver power for the next precoding operation.

Although features and elements are described above in particular combinations, each feature or element can be used alone without the other features and elements or in various combinations with or without other features and elements. The methods or flow charts provided herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for processing feedback bits implemented in a wireless transmit/receive unit (WTRU), comprising:
   estimating a channel matrix by the wireless WTRU;
   calculating an effective channel;
   selecting a precoding matrix from a set of precoding matrices;
   computing a differential precoding matrix or delta matrix;
   quantizing the differential precoding matrix or delta matrix;
   generating the feedback bits by the WTRU; and
   transmitting the feedback bits from the WTRU, wherein the set of precoding matrices is constructed using a Discrete Fourier Transform (DFT) matrix multiplied with different phase shifts.

2. The method of claim 1 wherein selecting the precoding matrix includes selecting the precoding matrix based upon a metric, wherein the metric includes any one of the following: signal to interference noise ratio (SINR), throughput, block error rate (BER), frame error rate, and channel capacity.

3. The method of claim 1 wherein the effective channel is a multiplication of the channel estimate with precoding matrices.

4. The method of claim 1 wherein selecting the precoding matrix includes calculating the precoding matrix from the channel matrix estimate.

5. The method of claim 4 wherein selecting the precoding matrix further comprises:
   quantizing the precoding matrix using a predetermined codebook.

6. The method of claim 1 wherein the feedback bits include a codeword index.

7. The method of claim 1, further comprising:
   updating the precoding matrix.

8. A method for processing feedback bits implemented in a wireless transmit/receive unit (WTRU), comprising:
   constructing a set of precoding matrices using a Discrete Fourier Transform (DFT) matrix multiplied with different phase shifts;
   selecting a precoding matrix from the set of precoding matrices by the by the wireless WTRU;
   computing a differential precoding matrix or delta matrix;
   quantizing the differential precoding matrix or delta matrix;
   generating the feedback bits by the WTRU; and
   transmitting the feedback bits from the WTRU.

9. The method of claim 8 wherein the feedback bits include a codeword index.

10. The method of claim 8, further comprising:
    updating the precoding matrix.

11. A wireless transmit/receive unit (WTRU), comprising:
    a channel estimator configured to receive a signal and estimate a channel; and
    a feedback bit generator in communication with the channel estimator, the feedback bit generator configured to determine a precoding matrix from a set of precoding matrices, generate a differential feedback bit and transmit the differential feedback bit, wherein the set of precoding matrices is constructed using a Discrete Fourier Transform (DFT) matrix multiplied with different phase shifts.

12. The WTRU of claim 11 wherein the feedback bit generator is further configured to generate a binary feedback bit.

13. The WTRU of claim 11 wherein the feedback bit generator is configured to generate a non-differential feedback bit.

14. The WTRU of claim 11 wherein the precoding matrix is determined based upon at least one of: a signal to interference noise ratio (SINR), a throughput, a block error rate (BER), a frame error rate, or a channel capacity.

15. The WTRU of claim 11, wherein the feedback bit generator is further configured to determine a feedback rate based at least in part on a Doppler adjustment.

16. A wireless transmit/receive unit (WTRU), comprising:
a channel estimator configured to receive a signal and estimate a channel; and
a feedback bit generator in communication with the channel estimator, the feedback bit generator configured to determine a precoding matrix from a set of precoding matrices, generate a binary feedback bit and transmit a binary feedback bit, wherein the set of precoding matrices is constructed using a Discrete Fourier Transform (DFT) matrix multiplied with different phase shifts.

17. The WTRU of claim 16 wherein the feedback bit generator is configured to generate a non-differential feedback bit.

18. The WTRU of claim 16 wherein the feedback bit generator is configured to generate a differential feedback bit.

19. The WTRU of claim 16 wherein the precoding matrix is further determined based upon at least one of: a signal to interference noise ratio (SINR), a throughput, a block error rate (BER), a frame error rate, or a channel capacity.

20. The WTRU of claim 16, wherein the feedback bit generator is further configured to determine a feedback rate based at least in part on a Doppler adjustment.

\* \* \* \* \*

UNITED STATES PATENT AND TRADEMARK OFFICE
CERTIFICATE OF CORRECTION

| | | |
|---|---|---|
| PATENT NO. | : 9,225,400 B2 | Page 1 of 1 |
| APPLICATION NO. | : 14/318495 | |
| DATED | : December 29, 2015 | |
| INVENTOR(S) | : Kyle Jung-Lin Pan and Allan Y. Tsai | |

It is certified that error appears in the above-identified patent and that said Letters Patent is hereby corrected as shown below:

In the Claims:

Column 10, Claim 8, Line 36: delete "by the" (2nd occurrence).

Signed and Sealed this
Nineteenth Day of April, 2016

Michelle K. Lee
*Director of the United States Patent and Trademark Office*